United States Patent [19]

Granqvist

[11] Patent Number: 4,953,922

[45] Date of Patent: Sep. 4, 1990

[54] WEB MATERIAL FOR CAMOUFLAGE AGAINST ELECTROMAGNETIC RADIATION

[75] Inventor: Claes Göran Granqvist, Mölndal, Sweden

[73] Assignee: HB Radicool Research & Development, Sweden

[21] Appl. No.: 314,764

[22] PCT Filed: Aug. 21, 1987

[86] PCT No.: PCT/SE87/00367

§ 371 Date: Feb. 7, 1989

§ 102(e) Date: Feb. 7, 1989

[87] PCT Pub. No.: WO88/01363

PCT Pub. Date: Feb. 25, 1988

[30] Foreign Application Priority Data

Aug. 21, 1986 [SE] Sweden ................................ 8603522

[51] Int. Cl.[5] .......................... F41H 3/00; G02B 5/22; G02B 5/26; G02B 5/28

[52] U.S. Cl. ....................................... 350/1.7; 350/1.6; 428/919

[58] Field of Search .................... 428/919, 17; 350/1.6, 350/1.7

[56] References Cited

U.S. PATENT DOCUMENTS

| | | | |
|---|---|---|---|
| 4,308,882 | 1/1982 | Pusch et al. | 428/919 |
| 4,479,994 | 10/1984 | Berg | 428/919 |
| 4,495,239 | 1/1985 | Pusch et al. | 428/919 |
| 4,529,633 | 7/1985 | Karlsson | 428/919 |
| 4,615,921 | 10/1986 | Johansson | 428/919 |
| 4,640,851 | 2/1987 | Pusch | 428/919 |
| 4,659,602 | 4/1987 | Birch | 428/919 |

FOREIGN PATENT DOCUMENTS

| | | | |
|---|---|---|---|
| 795464 | 5/1958 | United Kingdom | 428/919 |

*Primary Examiner*—Bruce Y. Arnold
*Assistant Examiner*—Terry S. Callaghan

[57] ABSTRACT

Web material for camouflaging against electromagnetic radiation whereby the material (1) comprises several layers (4, 5, 6) against the electromagnetic radiation which is directed against the material, whereby the material is provided with a front side (2), which is intended to be turned towards a potential observer or detector, as well as a backside (3), which is intended to be turned towards an object, which is to be camouflaged. The layers consist of a first layer (6), formed of a metallic foil (4), with at least one reflective surface toward the front side (2), a second layer (5), laid on the first surface of the first layer and chosen to be of a material which is absorbent for visible light and near-infrared radiation (wave length up to approximately 2 μm) as well as transparent for thermal infrared radiation (wave length region 3–100 μm) as well as, on the second layer, a third layer (6), one surface of which forms said front side (2), the layer being a plastic layer (6), chosen to provide an adapted absorbtion of radiation in the region 8–13 μm), whereby the front side (2) is textured in an embossed pattern by means of closely spaced groves (7).

6 Claims, 2 Drawing Sheets

WEB MATERIAL FOR CAMOUFLAGE AGAINST ELECTROMAGNETIC RADIATION

TECHNICAL FIELD

The present invention relates to a web material, a foil for camouflage against electromagnetic radiation. It relates particularly to a material which renders more difficult the possibility of detecting a camouflaged object using different forms of electromagnetic radiation, such as visible light, heat radiation or, for example, laser light from active detectors.

BACKGROUND

In order to provide camouflage against discovery, it is known to arrange material in the form of coverings, tarpaulins or foils, that is, web material, to cover the objects one wishes to camouflage. There are several possibilities of discovery against which one wishes to camouflage: By viewing with either diffuse or reflected visible light, by being revealed by reflections of radiation transmitted for reconnaisance purposes (for example laser light or radar waves) as well as by detection of the difference in infrared radiation from the objects in question and from their surroundings. Especially in the latter respect it has been difficult to achieve effective camouflage; the objects to be camouflaged, for example vehicles or buildings, often have heat radiation of their own, which is significantly greater than that of the surroundings, and they can therefore be discovered by means of detectors for infrared light, which can be made very sensitive.

The materials which have been developed for the purpose, in order to camouflage against infrared radiation, have utilized effects such as the limited emissions of a metallic layer or capturing in an insulating layer of the heat radiation from the layer itself. Structured surfaces, colored surfaces, layers consisting of lamina or grains, etc, have been resorted to against reflection of incident radiation.

Technical Problem

Indeed, it has been shown to be possible to find materials which provide good camouflage against discovery by some form of electromagnetic radiation. However this is not sufficient; in order to achieve fully satisfactory camouflaging, the possibilities for discovery using every form of electromagnetic radiation must be eliminated or at least greatly reduced. It is thus necessary to shield the object against discovery by direct observation by an observer as well as against discovery by means of some type of passive or active detectors. It has proven difficult to achieve this even though, in accordance with many suggestions, one has resorted to very complicated structures in the form of thick tarpaulins with broken surfaces and several layers. For the purposes of practical camouflage the worth of such a material is, however, limited because of the difficulties involved in handling and, in transportation.

The Solution

The camouflaging web material according to the invention comprises several layers and is provided with a front side, which is intended to be turned towards a potential observer or detector, as well as a backside, which is intended to be turned towards an object, which is to be camouflaged, wherein a first layer is formed of a metallic foil with at least one reflective surface toward the front side and with a second surface turned towards the backside a second layer is laid on the first surface of the first layer and is chosen to be of a material which is absorbent for visible light and near-infrared radiation (wave length up to approximately 2 μm) as well as transparent for thermal infrared radiation (wave length region 3–100 μm) and that, on the second layer, a third layer is provided, one surface of which forms said front side, the layer being a plastic layer, having a precisely determined thickness and chosen to provide an adapted absorption of radiation in the region 8–13 μm), whereby the front side is textured in an embossed pattern by means of closely spaced groves.

Advantages

By means of the invention a material is achieved having good camouflaging characteristics with respect to all previously known methods of detection, the material being made thin and light and can furthermore be produced using efficient industrial methods of mass production.

Another advantage is that, by means of the invention, a material can be provided which is so thin that it can be produced in the form of a foil which is easy to handle and which can be made self-adhesive for direct securing onto the surface of camouflaged objects.

BRIEF DESCRIPTION OF DRAWINGS

An embodiment of the material will be described below. Reference will be made to a diagram showing radiation conditions which arise in connection with the material.

BEST MODE OF CARRYING OUT THE INVENTION

The best mode of carrying out the invention is a foil having a thickness on the order of tenths of a mm. By making it self-adhesive it can be secured directly onto the surfaces of the objects which are to be camouflaged. This concerns primarily objects with hard, smooth surfaces such as vehicles and other machine equipment, but also certain buildings. It is thus in this preferred product form that the material according to the invention is to be supplied. Within the scope of the invention, however, the material can be supplied in other product forms as well, such as tarpaulins, hoods or other casings for covering objects, or plates which are to be set up or secured. The active part of such products is, however, a foil in accordance with the invention but, for these types of products, it can of course be applied in other ways than as a self-adhesive layer. The foil contained in the preferred product form, as well as in other product forms, can in turn have alternative detailed constructions, one of which will be described below by way of example. As far as its principle construction is concerned, the foil is, however, the same in all forms, and this principle construction will be described below.

Figure 1:
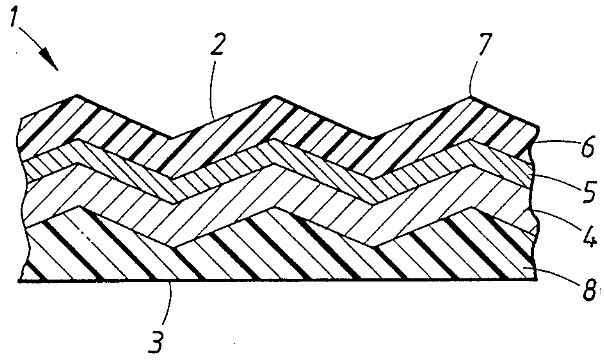
FIG. 1 shows a cross section of a preferred embodiment.

According to FIG. 1 the foil according to the invention, which is designated by 1, exhibits a front side 2, which is intended to be turned outwards towards the potential observer or detector, and a backside which is to be turned towards the object which is to be camouflaged. The foil is built up from a number of layers. Near the backside 3 there is a thin metallic foil 4 with a reflective surface. It is important that the foil should be reflective on the surface which is turned towards the front side 2. It is advantageous that even its inner surface be reflective, but it can however, alternatively be provided with an underlying layer, even colored throughout, as a carrier for increasing the mechanical strength without affecting significantly the camouflaging properties mentioned below. On the metallic foil 4 is applied a surface coating 5 which has the property of being absorbent for visible light and near-infrared radiation (wave lengths up to approximately 2 μm) but transparent for thermal-infrared radiation) the wave length region 3–100 μm).

Figure 2:
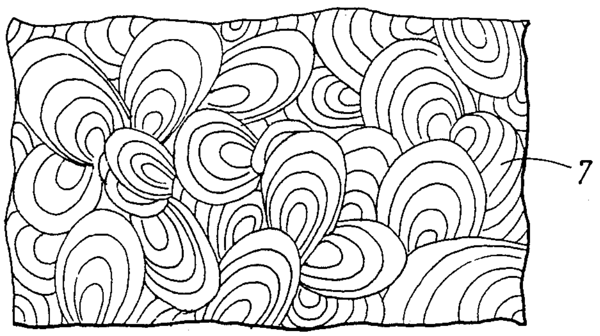
FIG. 2 shows a view of the material according to the embodiment from its front side.
Figure 3:
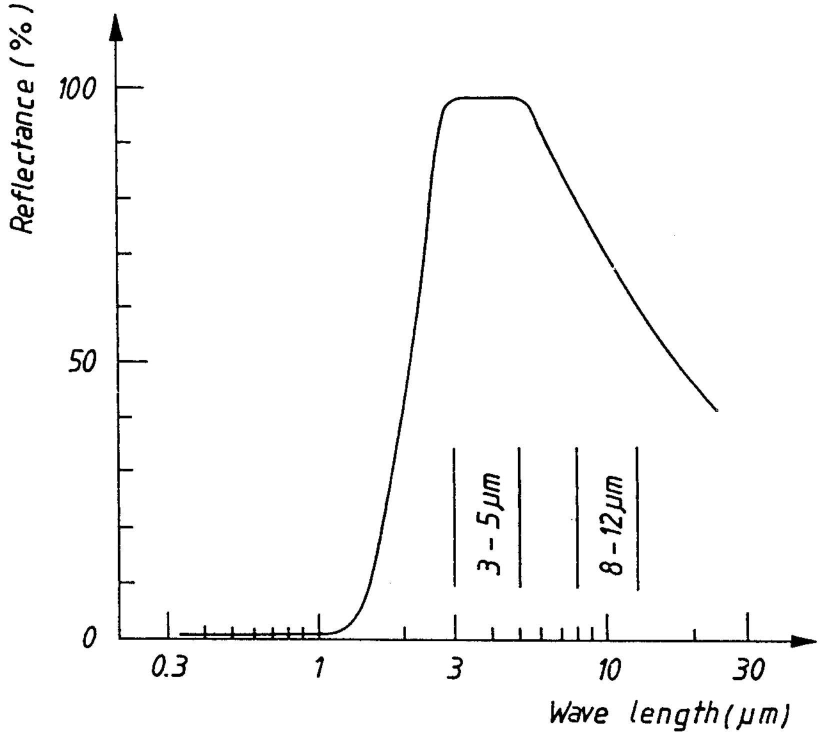
FIG. 3 shows a schematic reflectance curve.

The surface coating 5 supports a plastic layer 6 having a precisely determined thickness, the outwardly turned surface of which forms said front surface 2. The front surface of the foil is textured by means of an embossment 7. This embossment may consist of a large number of tightly packed groves, which form an irregular pattern. An example of such a pattern is shown in a view of the material in FIG. 2.

In accordance with FIG. 1 the preferred embodiment of the foil exhibits an adhesive layer 8 on its backside 3. This is of a self-adhesive type so that the foil may be secured on surfaces of an object, preferably the object which is to be camouflaged, or onto a fabric, a plate or some other supporting material.

On a following page, in the form of a table, the specific effect of each layer and the means by which this effect is achieved are shown. The effect is related to specific wave length regions expressed in micrometers for light radiation and thermal radiation and in mm for radio waves. The specified reflection relates to reflection from the front surface 2 of radiation directed against it in the form of visible light, laser light and radar waves. The reflection in the region for thermal infrared (IR) radiation is given as comparative values. Camouflage against IR-radiation, which is directed against the front surface is, however, not of primary interest but rather, the camouflage against radiation in the thermal region relates to camouflaging the radiation of the camouflaged object itself because of it having a different temperature than the surroundings, which is often the case with vehicles, other machine equipment, and buildings. Therefore, for the thermal wave length region even emission, that is, radiation from the front surface 2 because of the temperature of the foil, which can be influenced for example by incident radiation against the backside 3 or by conduction, is given. It is to be noted that reflection and emission for a surface are inversely proportional to one another.

An explanation of how the effects given in the table can be achieved is given below:

For visible light which strikes an object without causing direct reflections to an observer, a certain irregularity by means of texturing and color variations makes it difficult to discern when it is located in an environment which has surfaces which are similarly irregularly textured and colored such as often occur in terrain. These important effects for lessening the risk of discovery by observation are achieved by means of a suitable texturing of the plastic layer 6 in the manner shown in FIG. 2. According to FIG. 1, the entire material 1, in the form of foil, can be embossed so that the texturing is produced. If the material is to be fastened on a smooth surface the adhesive layer 8 can then even out the unevenness of the backside of the foil so that fully satisfactory contact is achieved. In FIG. 1 the embossment is exaggerated, as well as the thickness of the material. The material is preferably only a few tenths of a mm thick so that the embossment is only a few hundredths or tenths of a mm high. The said color variations can be achieved by varying the thickness of the surface coating layer 5 of the metallic foil. Interference phenomena thereby give rise to different colors, preferably in the green and blue regions. In this way one avoids coloring using pigment, as has previously been common, which can disturb the desired influence on radiation in regions other than visible light.

Discovery using visible light can also occur due to light reflected from an opposing light source, for example, the sun when low in the sky. This light has a tendency to be concentrated in planar and concave surfaces. Even in this case an advantageous effect is achieved by means of the texturing 7, which scatters the light and in this way one may avoid reflected flashes.

When it comes to discovery by means of radiation from active detectors and in the form of laser light or radar waves, generally the same method can be used as has been described for visible light, that is, texturing of the surface and avoidance of planar and concave surfaces, which give strong radar echos. The effect of texturing is mainly that it scatters the radiation and lessens the reflection which is intended to be used for detection.

That which has been said above thus applies to radiation striking the front surface of the material. In addition, radiation coming from the camouflaged object is to be camouflaged. In this case what is required is to lessen the thermal radiation from the object, if it has a temperature higher than its surroundings, to a level, which corresponds to the radiation of the surroundings. This is done by means of the metallic foil 4, which has high reflectivity and therefore low emission, whereby the desired emission at the level of the surroundings can be maintained.

The metallic foil itself has, however, certain negative effects when it comes to other radiation. Since it is reflective, without special measures it would lead to a great risk of discovery when struck by radiation in the form of visible light or from active detectors. Masking the metallic foil using an opaque coating would, on the other hand, lessen or eliminate the effect on the IR-radiation from the camouflaged object. By means of the surface coating 5, however, the effect is achieved that the said incident radiation is damped with respect to reflection by the surface of the metallic foil whereas reflection of IR-radiation is retained and, hence, the low, adapted thermal emission as well.

This is accomplished in the coating by means of radiation selective influence, in particular, by means of a particle construction of the layer which provides a particle distance in the region for the wave length of visible light. It is absorbed to a great extent between the particles whereas the IR-radiation, with its longer wave length, passes the particle bed. The layer can be built up of non-transparent particles and transparent particles, which form the transparent portions, where the visible light is absorbed. In this case the surface coating can consist of a mixture of metallic nickel and nickel oxide, which is transparent. The thickness in this case is less than 1 μm. The color is dark blue to black. The particle size for nickel dioxide and preferably for the nickel particles as well should lie in the region 10–1.000 Å (10.000 Å = 10 μm) and preferably in the region 100–1.000 Å. This radiation selective effect can however also be achieved using different compositions than the one mentioned, preferably particles of a metal and its oxide.

The metal foil thus adjusts the emission in the thermal region from the camouflaged object. It is however the case that the emission in the central thermal region, approximately 8–13 μm, is not affected to such a degree as would be desired. According to the invention this region is therefore influenced by a special means, namely, the plastic layer 6. It has namely been shown that certain types of plastics, especially polytetrafluoroethylene, Teflon ® is absorbent with respect to this thermal region.

Influence of the radiation within the said region will, just as influence within the other thermal region, be adjusted so that the IR-radiation corresponds to the IR-radiation of the surroundings. This adjustment is carried out by means of an adapted thickness for the plastic layer. When using polytetrafluoroethylene, a thickness of 10–20 μm is suitable. By building up the material with the metallic foil, which generally lessens the emission in the thermal region, and the surface coating on it, which eliminates reflections from incident radiation, as well as with the plastic layer, which provides a complementing influence of the thermal radiation as well as enabling influence, primarily because of its texture, of visible light and radiation from active detectors, a very all-round material with respect to camouflaging radiation influence has been achieved. It is also possible to create using very thin layers and can advantageously be made as a self-adhesive foil for securing directly onto objects such as vehicles. These can thus be camouflaged in such a way that they are usable and they thus do not need to be enclosed and covered, which is something which would impede or prevent their use when camouflaged.

In addition to the camouflaging characteristics given under the title Effect in the table, the following characteristics should be aimed for: Good resistance to corrosion, which is attained primarily by the choice of a suitable metal in the foil 4 combined with a choice of plastic in the layer 6; as well as good thermal contact with the base, which is achieved primarily by good adhesion of the product which is preferably made as a self-adhesive foil. The texturing 7 of the surface layer must in this case not affect the backside 3 in such a way that the adhesive bond is jeopardized.

An example of a detailed specification for a foil is given below by means of which the characteristics and effects given in the table can be achieved.

EXAMPLE

The metallic foil 4 is based primarily on nickel.

The surface coating 5 consists of a mixture of particles of nickel oxide and metallic nickel. The thickness is less 1 μm. The color is dark blue to black.

The surface layer 6 consists of a polymer layer. Polytetrafluoroethylene (Teflon ®) has been shown to provide desirable characteristics. The layer can be applied to the underlying surface coating 5 by means of dip-coating.

The texturing 7 on the front surface 2 has been defined earlier.

The adhesive layer 8 can be of a previously known type which is used for self-adhesive metallic foils for use with solar collectors.

| Method, layer | Wave Length region | Radiation characteristics Reflection | Emission | Effect |
|---|---|---|---|---|
| The plastic layer's 6, texturing 7. | 0.4–0.7 μm visible light (observer) | Low and scattered in all positional conditions between the light source and the observer/detector | — | Visual detection made more difficult by low reflection and scattered light with insignificant glare spots (reflections of incident light). |
| | 1.06 μm Nd-laser (active detector) | Low and scattered with little interference. | — | Same effect and also avoidance of interference effect. |
| | 3–9 mm radar waves (active detector) | As from normal surfaces | — | Does not amplify radar echo in relation to non-camouflaged surfaces. |
| The plastic layer 6. | 8–13 μm, central IR-region (passive detector) | (Medium high) | Medium low | Absorbs the radiation from camouflaged object in the central thermal region. |
| The surface coating 5 on the metallic foil 4. | Visible light<br>near IR-radiation, appr. 2 μm laser | Low<br>Low | — | Prevents reflection of short wave length light, primarily visible, in the metallic foil 4, but does not hinder the effect of the metallic foil on the thermal radiation from the camouflaged object. |
| Varying thickness of the surface coating 5. | Visible light | With color variations | | Provides color variation which makes detection more difficult. |
| The metallic foil 4, its outer surface. | Thermal radiation 3–100 μm especially 3–5 μm, lower IR-region effect even in the central IR-region (passive | (High) | Low | Gives IR-radiation which corresponds to the radiation of the surroundings. This conceals the radiation from the camouflaged object itself in the thermal region. |

-continued

| Method, layer | Wave Length region | Radiation characteristics Reflection | Emission | Effect |
|---|---|---|---|---|
| | detector) | | | |

I claim:

1. Web material for camouflaging against electromagnetic radiation, and having a front side, which is intended to face a potential observer or detector, as well as a backside, which is intended to face an object, which is to be camouflaged, the material comprising several layers, a first layer of a metal foil with a first reflective surface facing the front side and with a second reflective surface facing the backside; a second layer covering the first surface of the first layer and chosen to be of a material which is absorbent for visible light and near-infrared radiation as well as transparent for thermal infrared radiation; and on the second layer, a third layer, an outer surface of which forms said front side, the third layer being a plastic layer, provided to have a precisely determined thickness to perform an adapted absorption of radiation in the region 8–13 μm by means of interference, the outer surface forming the front side being textured in an embossed pattern having closely spaced grooves.

2. Web material according to claim 1, in which the metal foil substantially being nickel, the second layer having a thickness generally less than 1 μm and consisting substantially of a mixture of particles of a metal and its oxide with a particle size in the region 10–1,000 Å preferably 100–1,000 Å and the third layer consisting of polytetrafluoroethylene.

3. Web material according to claim 2, in which there are particles in the second layer consisting of nickel and nickel oxide.

4. Web material according to claim 2 or 3, in which the thickness of the third layer is in the region 10–20 μm.

5. Web material according to claim 1 or 2, in which the second layer has varying thickness within the region of influence on the color of reflected lights by means of interference, the thickness being chosen to provide color variations in the region for blue and green colors.

6. Web material for camouflaging including a first layer of a metal foil with a first reflective surface facing an intended front side of the material and with a second reflective surface facing the backside of the material; a second layer covering the first surface of the first layer and chosen to be of a material, which is absorbent for visible light and near-infrared radiation as well as transparent for thermal infrared radiation; and on the second layer, a third layer, an outer surface of which forms said front side, the third layer being a plastic layer, provided to have a precisely determined thickness to perform an adapted absorption of radiation in the regions 8–13 μm by means of interference, the outer surface forming the front side being textured in an embossed pattern having closely spaced grooves, in said second surface of the first layer being coated with an adhesive layer arranged for securing the material onto the surface of an object, which is to be camouflaged.

* * * * *